United States Patent [19]

Story et al.

[11] Patent Number: 5,774,744
[45] Date of Patent: Jun. 30, 1998

[54] SYSTEM USING DMA AND DESCRIPTOR FOR IMPLEMENTING PERIPHERAL DEVICE BUS MASTERING VIA A UNIVERSAL SERIAL BUS CONTROLLER OR AN INFRARED DATA ASSOCIATION CONTROLLER

[75] Inventors: Franklyn H. Story, Chandler; David R. Evoy, Tempe; Peter Chambers, Scottsdale; Lonnie Goff, Tempe, all of Ariz.

[73] Assignee: VLSI Technology, Inc., San Jose, Calif.

[21] Appl. No.: 627,986

[22] Filed: Apr. 8, 1996

[51] Int. Cl.$^6$ .................................................. G06F 13/00
[52] U.S. Cl. ......................... 395/847; 395/842; 395/848; 395/308
[58] Field of Search ..................................... 395/842, 288, 395/299, 309, 847, 856, 308, 281, 848

[56] References Cited

U.S. PATENT DOCUMENTS

| | | | |
|---|---|---|---|
| 5,265,211 | 11/1993 | Amini et al. | 395/856 |
| 5,287,457 | 2/1994 | Arimilli et al. | 395/308 |
| 5,325,535 | 6/1994 | Santeler et al. | 395/288 |
| 5,450,551 | 9/1995 | Amini et al. | 395/299 |
| 5,454,081 | 9/1995 | Thome | 395/281 |
| 5,469,548 | 11/1995 | Callison et al. | 395/441 |
| 5,542,053 | 7/1996 | Bland et al. | 395/309 |
| 5,590,377 | 12/1996 | Smith | 395/842 |
| 5,613,162 | 3/1997 | Kabenjian | 395/842 |
| 5,619,728 | 4/1997 | Jones et al. | 395/847 |
| 5,621,902 | 4/1997 | Cases et al. | 395/309 |

Primary Examiner—Frank J. Asta
Assistant Examiner—Le Hien Luu
Attorney, Agent, or Firm—Harry M. Weiss; Jeffrey D. Moy; Harry M. Weiss & Associates, P.C.

[57] ABSTRACT

The present invention relates to a system and method for implementing peripheral device bus mastering in a mobile computer system. The system uses the mobile computer system's microcontroller for programming a DMA controller, generating and sending command signals, and receiving completion status after transfer of data is complete. The micro-controller accesses a data buffer descriptor list. The data buffer descriptor list describes each data transfer that the micro-controller initiates, controls, and completes. The Direct Memory Access controller which is programmed by the micro-controller transfers data to and from a memory section of the mobile computer system. A bus controller is used for implementing a memory data transfer request from the DMA controller means and the micro-controller means. A device controller such as a Universal Serial Bus (USB) controller or an Infrared Data Association (IrDA) controller is used for receiving and responding to command signals from the micro-controller, transferring data to and from the DMA controller, and generating and returning a completion status to the micro-controller after the transfer of data is complete.

20 Claims, 2 Drawing Sheets

SYSTEM USING DMA AND DESCRIPTOR FOR IMPLEMENTING PERIPHERAL DEVICE BUS MASTERING VIA A UNIVERSAL SERIAL BUS CONTROLLER OR AN INFRARED DATA ASSOCIATION CONTROLLER

RELATED APPLICATIONS

This application is related to the applications entitled "SYSTEM FOR IMPLEMENTING PERIPHERAL DEVICE BUS MASTERING AND METHOD THEREFOR," "A MOBILE COMPUTER SYSTEM HAVING PERIPHERAL DEVICE BUS MASTERING AND METHOD THEREFOR," "A DESKTOP PERSONAL COMPUTER SYSTEM HAVING PERIPHERAL DEVICE BUS MASTERING AND METHOD THEREFOR," and "SYSTEM AND METHOD FOR IMPLEMENTING PERIPHERAL DEVICE BUS MASTERING IN A DESKTOP PERSONAL COMPUTER SYSTEM VIA AN INTEGRATED DRIVE ELECTRONICS HARD DISK CONTROLLER OR AN EXTENDED CAPABILITIES PORT PARALLEL PORT CONTROLLER" filed concurrently herewith, in the name of the same inventors, and assigned to the same assignee as this Application. The disclosures of the above referenced applications are hereby incorporated by reference into this application.

BACKGROUND OF THE INVENTION

1. Field of the Invention

This invention relates generally to computer systems and, more specifically, to a system and method which allows for the implementation of peripheral device bus mastering in a mobile computer system via a Universal Serial Bus (USB) controller or an Infrared Data Association (IrDA) controller.

2. Background of the Invention

Bus mastering is the ability of an input/output (I/O) device to take over transactions on its own behalf. Bus mastering is becoming an important strategy in computer systems as the burden on central processing unit (CPU) bandwidth increases. Each reduction in time required by the CPU to control peripheral devices and their data flow results in an increase in available CPU bandwidth that includes operating system overhead for application interfaces and interrupt handling.

Currently, bus mastering is difficult in mobile computer systems (i.e., laptops, notebooks, personal assistants, etc.). This problem is a difficult one to solve since the real estate in most mobile computer system'architectures is extremely limited. Thus, the cost associated with implementing a bus mastering system must be cost effective (i.e., the hardware required to implement a mobile computer bus mastering system must be kept at a minimum).

Therefore, a need existed to provide a system and method for implementing peripheral device bus mastering in a mobile computer system. The system and method must require a minimal amount of additional hardware in order to make the system and method cost effective. The system and method must be able to handle multiple transactions without CPU intervention thereby further enhancing the time savings of the CPU. The system and method must also allow peripheral devices located on a serial bus to take over transactions on their own behalf.

SUMMARY OF THE INVENTION

In accordance with one embodiment of the present invention, it is an object of the present invention to provide a system and method for implementing peripheral device bus mastering in a mobile computer system.

It is another object of the present invention to provide a system and method for implementing peripheral device bus mastering in a mobile computer system which requires very little additional hardware to install.

It is still another object of the present invention to provide a system and method for implementing peripheral device bus mastering in a mobile computer system which uses a Universal Serial Bus (USB) controller or an Infrared Data Association (IrDA) controller for transferring data to and from a DMA controller.

It is still another object of the present invention to provide a system and method for implementing peripheral device bus mastering in a mobile computer system which is able to initiate and complete the processing of unattended transactions.

It is still another object of the present invention to provide a system and method for implementing peripheral device bus mastering in a mobile computer system which is able to handle multiple transactions without CPU intervention.

It is a further object of the present invention to provide a system and method for implementing peripheral device bus mastering in a mobile computer system which allows peripheral devices located on a serial bus to initiate transactions on their own behalf.

BRIEF DESCRIPTION OF THE PREFERRED EMBODIMENTS

In accordance with one embodiment of the present invention, a system for implementing peripheral device bus mastering in a mobile computer system is disclosed. The system is comprised of a mobile computer system. The mobile computer system has a Direct Memory Access (DMA) controller means for transferring data to and from the memory of the mobile computer system. Micro-controller means are coupled to the DMA controller means for programming the DMA controller means, generating and sending command signals, and receiving completion status after the transfer of data is complete. Descriptor means are created in the memory of the mobile computer system for describing each data transfer that the micro-controller means initiates, controls, and completes. Bus controller means are coupled to the DMA controller means and the micro-controller means for implementing a memory data transfer request from the DMA controller means and the micro-controller means. Universal Serial Bus (USB) controller means are coupled to the DMA controller means and the micro-controller means for receiving and responding to the command signals from the micro-controller means, transferring the data to and from the DMA controller means, and generating and returning the completion status to the micro-controller means after the transfer of data is complete. The USB controller means are further coupled to peripheral devices wherein the USB controller means interfaces with the peripheral devices over a serial bus.

In accordance with another embodiment of the present invention, a system for implementing peripheral device bus mastering in a mobile computer system is disclosed. The system is comprised of a mobile computer system. The mobile computer system has Direct Memory Access (DMA) controller means for transferring data to and from the memory of the mobile computer system. Micro-controller means are coupled to the DMA controller means for programming the DMA controller means, generating and sending command signals, and receiving completion status after the transfer of data is complete. Descriptor means are created in the memory of the mobile computer system for describing each data transfer that the micro-controller means initiates, controls, and completes. Bus controller means are coupled to the DMA controller means and the micro-controller means for implementing a memory data transfer request from the DMA controller means and the micro-controller means. Infrared Data Association (IrDA) controller means are coupled to the DMA controller means and the micro-controller means for receiving and responding to the command signals from the micro-controller means, transferring the data to and from the DMA controller means, and generating and returning the completion status to the micro-controller means after the transfer of data is complete. The IrDA controller means is further coupled to peripheral devices wherein the IrDA controller means is managed by a packet protocol that requires the management of a number of separate data packets of varying sizes.

In accordance with another embodiment of the present invention a method for implementing a system for peripheral device bus mastering in a mobile computer system is disclosed. The method comprises the steps of: providing a mobile computer system; providing Direct Memory Access (DMA) controller means coupled to the mobile computer system for transferring data to and from the memory of the mobile computer system; providing micro-controller means coupled to the DMA controller means for programming the DMA controller means, generating and sending command signals, and receiving completion status after the transfer of data is complete; providing descriptor means created in the memory of the mobile computer system for describing each data transfer that the micro-controller means initiates, controls, and completes; providing bus controller means coupled to the DMA controller means and the micro-controller means for implementing a memory data transfer request from the DMA controller means and the micro-controller means; and providing Universal Serial Bus (USB) controller means coupled to the DMA controller means and the micro-controller means for receiving and responding to the command signals from the micro-controller means, transferring the data to and from the DMA controller means, and generating and returning the completion status to the micro-controller means after the transfer of data is complete, the USB controller means further being coupled to peripheral devices wherein the USB controller means interfaces with the peripheral devices over a serial bus.

In accordance with another embodiment of the present invention a method for implementing a system for peripheral device bus mastering in a mobile computer system is disclosed. The method comprises the steps of: providing a mobile computer system; providing Direct Memory Access (DMA) controller means coupled to the mobile computer system for transferring data to and from the memory of the mobile computer system; providing micro-controller means coupled to the DMA controller means for programming the DMA controller means, generating and sending command signals, and receiving completion status after transfer of data is complete; providing descriptor means created in the memory of the mobile computer system for describing each data transfer that the micro-controller means initiates, controls, and completes; providing bus controller means coupled to the DMA controller means and the micro-controller means for implementing a memory data transfer request from the DMA controller means and the micro-controller means; and providing Infrared Data Association (IrDA) controller means coupled to the DMA controller means and the micro-controller means for receiving and responding to the command signals from the micro-controller means, transferring the data to and from the DMA controller means, and generating and returning the completion status to the micro-controller means after the transfer of data is complete, the IrDA controller means further being coupled to peripheral devices wherein the IrDA controller means is managed by a packet protocol that requires the management of a number of separate data packets of varying sizes.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
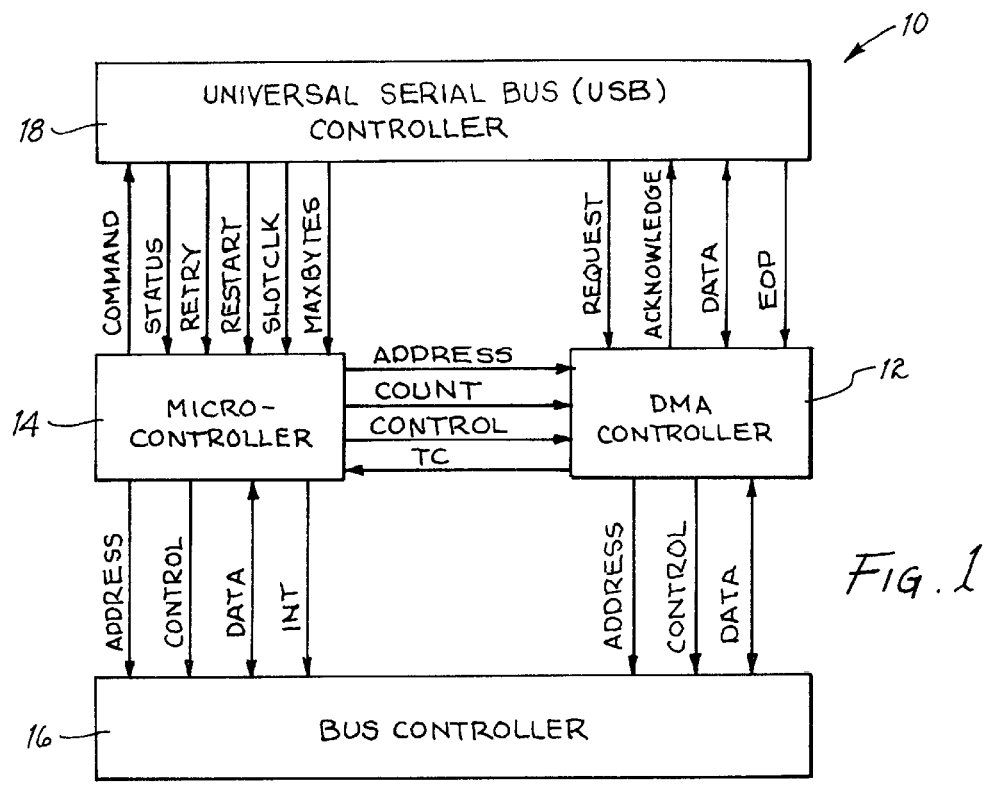
FIG. 1 is a simplified block diagram of a system for implementing peripheral device bus mastering in a mobile computer system via a Universal Serial Bus (USB) controller.

Referring to FIG. 1, one embodiment of a mobile computer system having a peripheral device bus mastering system 10 (hereinafter system 10) is shown. The system 10 is comprised of a Direct Memory Access (DMA) controller 12. The DMA controller 12 is used for transferring data to and from a memory section of the mobile computer system. In the preferred embodiment of the present invention, the DMA controller 12 is implemented as a distributed DMA target slice. By implementing the DMA controller 12 as a distributed DMA target slice, several advantages are realized. First, the distributed DMA target slice is a pre-existing block. Thus, it does not require a new design. Second, since the DMA target slice is an industry standard interface, standard software may be leveraged as well. Furthermore, since the distributed DMA target slice is a pre-existing block, the cost associated with implementing the system 10 can be reduced.

Figure 3:
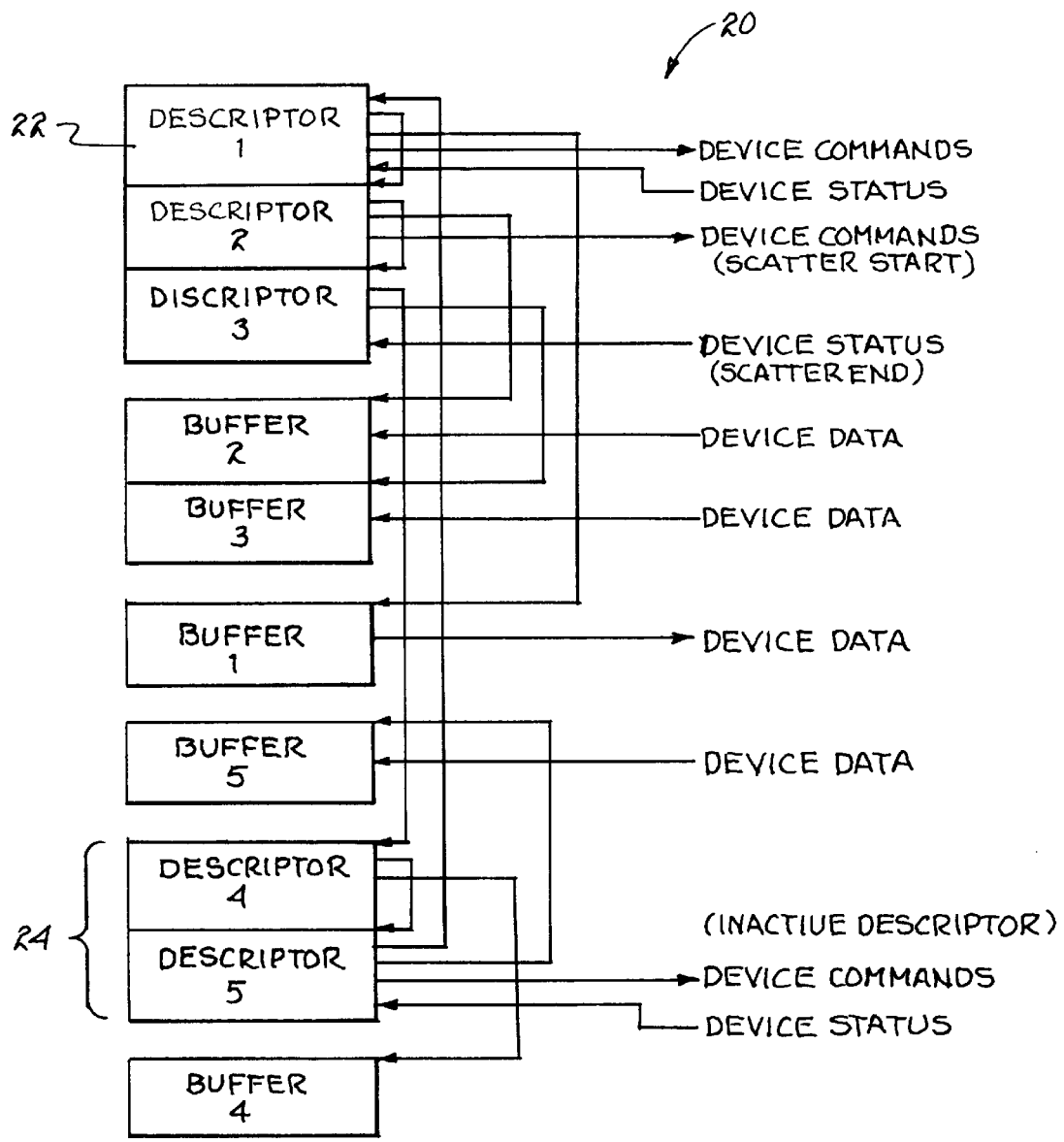
FIG. 3 is a simplified block diagram of a data buffer descriptor list used by the system depicted in FIGS. 1 and 2.

A micro-controller 14 is coupled to the DMA controller 12. Since most mobile computer systems (i.e., laptops, notebooks, personal assistants, etc.) are already equipped with a micro-controller 14, the implementation of the system 10 can be achieved with the addition of very little hardware. The micro-controller 14 is used for programming the DMA controller 12, generating and sending command signals, and receiving completion status after the transfer of data is complete. The micro-controller 14 accesses a data buffer descriptor list 20 (FIG. 3). Each element of the data buffer descriptor list 20 describes a data transfer that the microprocessor 14 initiates, controls, and completes. The data buffer descriptor list 20 also minimizes the hardware requirements of the system 10 and is used for implementing peripheral device bus mastering and for providing a flexible interface for a user of the system 10.

The system 10 is further comprised of a bus controller 16. The bus controller 16 is coupled to the DMA controller 12 and the micro-controller 14. The bus controller 16 is used for implementing a memory data transfer request from the DMA controller 12 and the micro-controller 14.

A Universal Serial Bus (USB) controller 18 is coupled to the DMA controller 12 and to the micro-controller 14. The USB controller 18 is used for receiving and responding to command signals from the micro-controller 14, transferring data to and from the DMA controller 12, and generating and returning a completion status signal to the micro-controller 14 after the transfer of data is complete. The USB controller 18 is further coupled to peripheral devices. The USB controller 18 interfaces with these peripheral devices over a serial bus. Each of the peripheral devices that are coupled to the USB controller 18 appear to the system 10 as a separate and independent data path. Each of these separate and independent data paths are represented by a separate descriptor 22 (FIG. 3) within the data buffer descriptor list 20. Each descriptor 22 is configured independently to reflect the characteristics of an individual peripheral device's data path. It should be noted that each of the separate and independent data paths could be represented by a set of descriptors 24 (FIG. 3) within the data buffer descriptor list 20.

Figure 2:
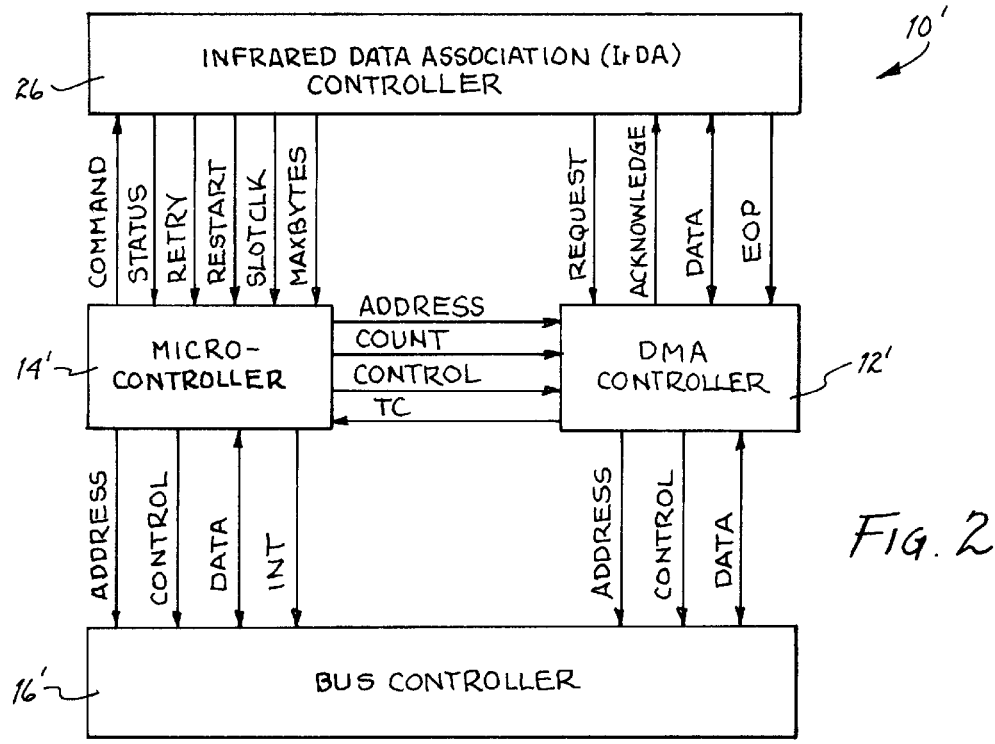
FIG. 2 is a simplified block diagram of a system for implementing peripheral device bus mastering in a mobile computer system via an Infrared Data Association (IrDA) controller.

Referring to FIG. 2, another embodiment of a mobile computer system having a peripheral device bus mastering system 10' (hereinafter system 10') is shown. Like the system 10 shown in FIG. 1, the system 10' is also comprised of a DMA controller 12', a micro-controller 14', a bus controller 16', and access a data buffer descriptor list 20 (FIG. 3). The DMA controller 12', the micro-controller 14', the bus controller 16' and the data buffer descriptor list 20 all function in the same manner as described above in the previous embodiment.

The main difference between the two embodiments is that the USB controller 18 of FIG. 1 has been replaced by an Infrared Data Association (IrDA) controller 26. The IrDA controller 26 is coupled to the DMA controller 12', the micro-controller 14', and to the peripheral devices. The IrDA controller 26 is used for receiving and responding to command signals from the micro-controller 14', transferring data to and from the DMA controller 12', and for generating and returning a completion status signal to the micro-controller 14' after the transfer of data is complete. The IrDA controller 26 is managed by a packet protocol that requires the management of a number of separate data packets of varying sizes. The separate data packets are transferred to and from the IrDA controller 26 when the system 10' under goes bus mastering.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for implementing peripheral device bus mastering in a mobile computer system comprising, in combination:

mobile computer system comprising:
Direct Memory Access (DMA) controller means for transferring data to and from memory of said mobile computer system;
micro-controller means coupled to said DMA controller means for programming said DMA controller means, generating and sending command signals, and receiving completion status after transfer of data is complete;
descriptor means created in said memory of said mobile computer system for describing each data transfer that said micro-controller means initiates, controls, and completes;
bus controller means coupled to said DMA controller means and said micro-controller means for implementing a memory data transfer request from said DMA controller means and said micro-controller means; and
Universal Serial Bus (USB) controller means coupled to said DMA controller means and said micro-controller means for receiving and responding to said command signals from said micro-controller means, transferring said data to and from said DMA controller means, and generating and returning said completion status to said micro-controller means after said transfer of data is complete, said USB controller means further being coupled to peripheral devices wherein said USB controller means interfaces with said peripheral devices over a serial bus.

2. A system for implementing peripheral device bus mastering in accordance with claim 1 wherein each of said peripheral devices appear to said system as a separate and independent data path.

3. A system for implementing peripheral device bus mastering in accordance with claim 2 wherein each said separate and independent data path is represented by a separate one of said descriptor means within a list of said descriptor means, each said separate one of said descriptor means being configured independently to reflect characteristics of an individual peripheral device's data path.

4. A system for implementing peripheral device bus mastering in accordance with claim 2 wherein each said separate and independent data path is represented by a set of said descriptor means within a list of said descriptor means, each set of said descriptor means being configured independently to reflect characteristics of an individual peripheral device's data path.

5. A system for implementing peripheral device bus mastering in accordance with claim 1 wherein said DMA controller means is implemented as a distributed DMA target slice.

6. A system for implementing peripheral device bus mastering in accordance with claim 1 wherein said micro-controller means is an embedded micro-controller located within said mobile computer system.

7. A system for implementing peripheral device bus mastering in a mobile computer system comprising, in combination:

mobile computer system comprising:
Direct Memory Access (DMA) controller means for transferring data to and from memory of said mobile computer system;
micro-controller means coupled to said DMA controller means for programming said DMA controller means, generating and sending command signals, and receiving completion status after transfer of data is complete;
descriptor means created in said memory of said mobile computer system for describing each data transfer that said micro-controller means initiates, controls, and completes;
bus controller means coupled to said DMA controller means and said micro-controller means for implementing a memory data transfer request from said DMA controller means and said micro-controller means; and
Infrared Data Association (IrDA) controller means coupled to said DMA controller means and said micro-controller means for receiving and responding to said command signals from said micro-controller means, transferring said data to and from said DMA controller means, and generating and returning said completion status to said micro-controller means after said transfer of data is complete, said IrDA controller means further being coupled to peripheral devices wherein said IrDA controller means is managed by a packet protocol that requires the management of a number of separate data packets of varying sizes.

8. A system for implementing peripheral device bus mastering in accordance with claim 7 wherein said separate data packets are transferred to and from said IrDA controller means.

9. A system for implementing peripheral device bus mastering in accordance with claim 7 wherein said DMA controller means is implemented as a distributed DMA target slice.

10. A system for implementing peripheral device bus mastering in accordance with claim 7 wherein said micro-controller means is an embedded micro-controller located within said mobile computer system.

11. A method for implementing a system for peripheral device bus mastering in a mobile computer system comprising the steps of:

providing a mobile computer system;

providing Direct Memory Access (DMA) controller means coupled to said mobile computer system for transferring data to and from memory of said mobile computer system;

providing micro-controller means coupled to said DMA controller means for programming said DMA controller means, generating and sending command signals, and receiving completion status after transfer of data is complete;

providing descriptor means created in said memory of said mobile computer system for describing each data transfer that said micro-controller means initiates, controls, and completes;

providing bus controller means coupled to said DMA controller means and said micro-controller means for implementing a memory data transfer request from said DMA controller means and said micro-controller means; and providing Universal Serial Bus (USB) controller means coupled to said DMA controller means and said micro-controller means for receiving and responding to said command signals from said micro-controller means, transferring said data to and from said DMA controller means, and generating and returning said completion status to said micro-controller means after said transfer of data is complete, said USB controller means further being coupled to peripheral devices wherein said USB controller means interfaces with said peripheral devices over a serial bus.

12. The method of claim 11 further comprising the step of providing USB controller means wherein each of said peripheral devices appear to said system as a separate and independent data path.

13. The method of claim 12 further comprising the steps of:

providing separate and independent data paths wherein each of said separate and independent data paths is represented by a separate one of said descriptor means within a list of said descriptor means; and configuring each of said separate one of said descriptor means being to independently reflect characteristics of an individual peripheral device's data path.

14. The method of claim 12 further comprising the steps of:

providing separate and independent data paths wherein each of said separate and independent data paths is represented by a set of said descriptor means within a list of said descriptor means; and configuring each of said set of descriptor means to independently reflect characteristics of an individual peripheral device's data path.

15. The method of claim 11 wherein said step of providing DMA controller means further comprises the step of implementing said DMA controller as a distributed DMA target slice.

16. The method of claim 11 wherein said step of providing micro-controller means further comprises the step of providing an embedded micro-controller located within said mobile computer system.

17. A method for implementing a system for peripheral device bus mastering in a mobile computer system comprising the steps of:

providing a mobile computer system;

providing Direct Memory Access (DMA) controller means coupled to said mobile computer system for transferring data to and from memory;

providing micro-controller means coupled to said DMA controller means for programming said DMA controller means, generating and sending command signals, and receiving completion status after transfer of data is complete;

providing descriptor means created in said memory of said mobile computer system for describing each data transfer that said micro-controller means initiates, controls, and completes;

providing bus controller means coupled to said DMA controller means and said micro-controller means for implementing a memory data transfer request from said DMA controller means and said micro-controller means; and providing Infrared Data Association (IrDA) controller means coupled to said DMA controller means and said micro-controller means for receiving and responding to said command signals from said micro-controller means, transferring said data to and from said DMA controller means, and generating and returning said completion status to said micro-controller means after said transfer of data is complete, said IrDA controller means further being coupled to peripheral devices wherein said IrDA controller means is managed by a packet protocol that requires the management of a number of separate data packets of varying sizes.

18. The method of claim 17 wherein said step of providing IrDA controller means further comprises the step of providing IrDA controller means that are able to transfer separate data packets to and from said IrDA controller means.

19. The method of claim 17 wherein said step of providing DMA controller means further comprises the step of implementing said DMA controller as a distributed DMA target slice.

20. The method of claim 17 wherein said step of providing micro-controller means further comprises the step of providing an embedded micro-controller located within said mobile computer system.

* * * * *